United States Patent [19]

Ukegawa

[11] Patent Number: 4,926,463
[45] Date of Patent: May 15, 1990

[54] DATA COMMUNICATION APPARATUS HAVING A REPROGRAMMABLE VOICE MEMORY

[75] Inventor: Takeshi Ukegawa, Hadano, Japan

[73] Assignee: Ricoh Company, Ltd., Tokyo, Japan

[21] Appl. No.: 277,310

[22] Filed: Nov. 29, 1988

[30] Foreign Application Priority Data

Nov. 30, 1987 [JP] Japan .......................... 62-183330[U]
Jul. 20, 1988 [JP] Japan ............................ 63-96883[U]

[51] Int. Cl.⁵ ...................... H04M 1/64; H04M 11/00
[52] U.S. Cl. ........................................ 379/88; 379/100
[58] Field of Search ...................... 379/88, 41, 51, 100

[56] References Cited

U.S. PATENT DOCUMENTS

| | | | |
|---|---|---|---|
| 4,585,907 | 4/1986 | Giammarrusco | 379/88 |
| 4,720,848 | 1/1988 | Alsiyama | 379/88 |
| 4,791,658 | 12/1988 | Simon et al. | 379/41 |
| 4,815,121 | 3/1989 | Yoshida | 379/67 |
| 4,829,559 | 5/1989 | Izawa et al. | 379/96 |

FOREIGN PATENT DOCUMENTS

| | | | |
|---|---|---|---|
| 3307169 | 9/1984 | Fed. Rep. of Germany | 379/88 |
| 0051058 | 3/1985 | Japan | 379/88 |
| 0002461 | 1/1986 | Japan | 379/88 |
| 0286350 | 12/1987 | Japan | 379/88 |
| WO87/07802 | 12/1987 | World Int. Prop. O. | 379/100 |

Primary Examiner—Thomas W. Brown
Attorney, Agent, or Firm—Oblon, Spivak, McClelland, Maier & Neustadt

[57] ABSTRACT

A facsimile machine includes a reprogrammable voice memory for storing a desired voice message. A memory card which is a fixed memory and stores a plurality of predetermined voice messages, is prepared by a manufacturer and the voice memory is set in position in the facsimile machine and the voice messages recorded on the memory card are selectively transferred to the reprogrammable voice memory.

6 Claims, 4 Drawing Sheets

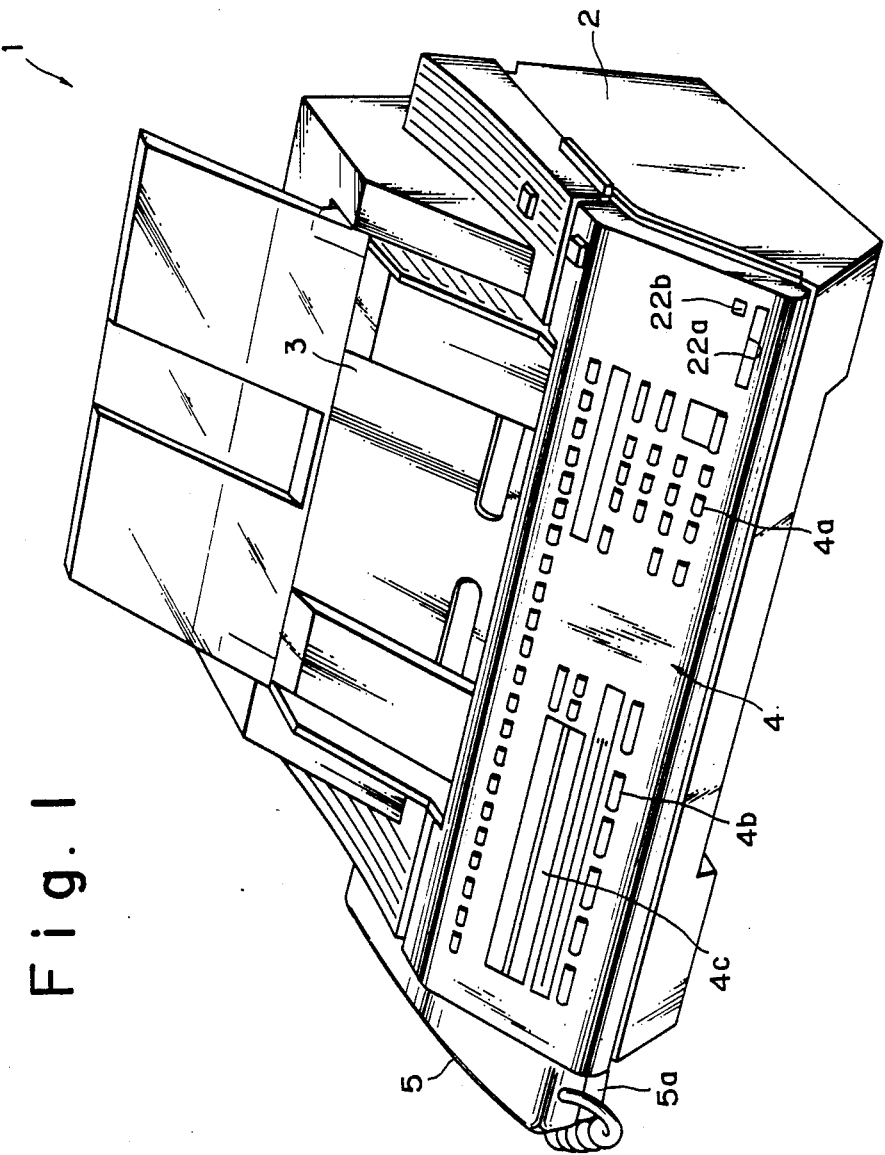

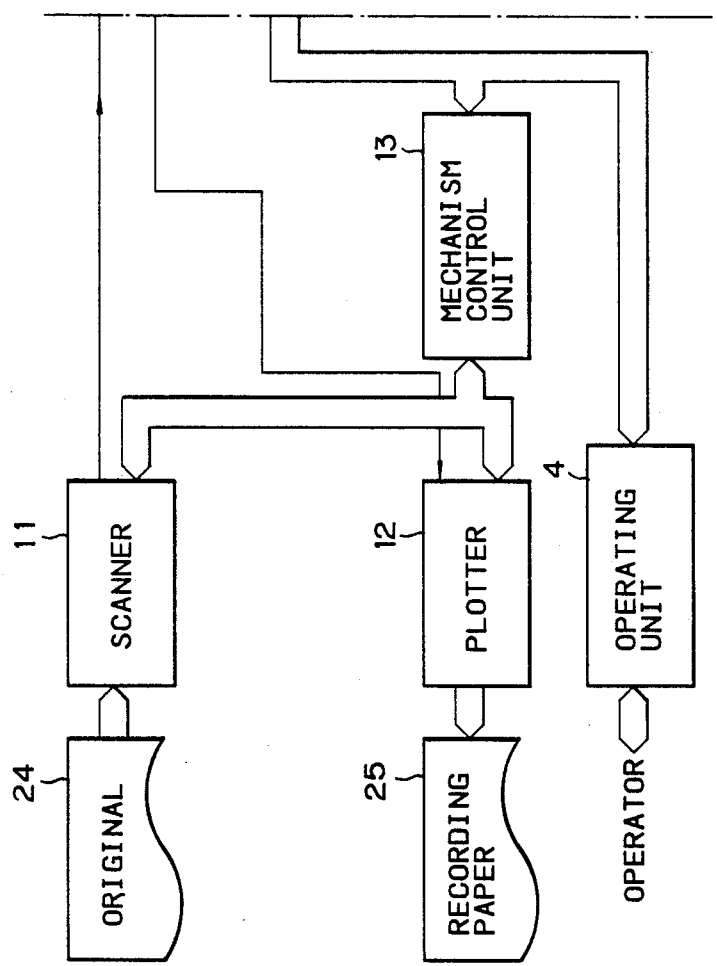

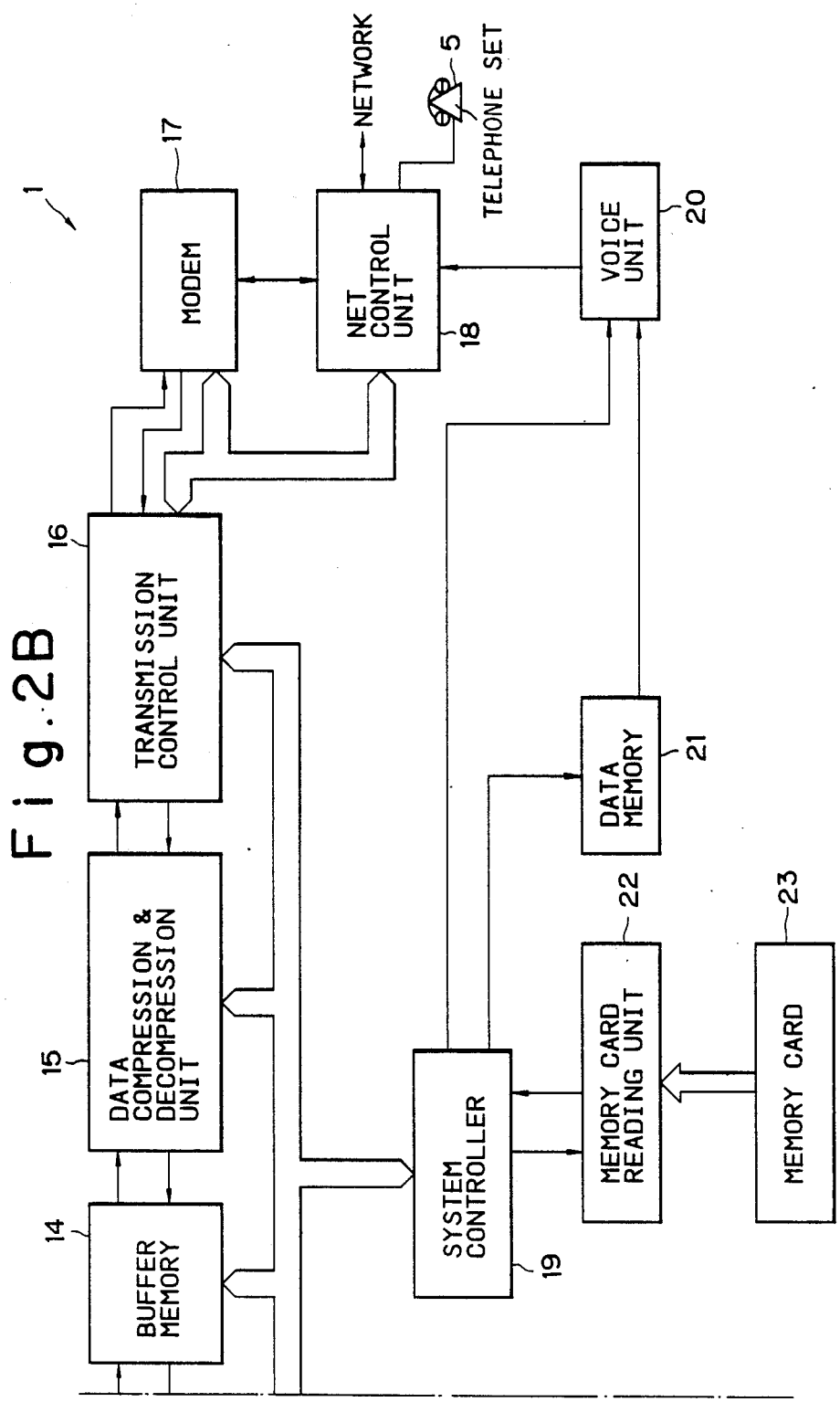

4,926,463

DATA COMMUNICATION APPARATUS HAVING A REPROGRAMMABLE VOICE MEMORY

BACKGROUND OF THE INVENTION

1. Field of the Invention

This invention generally relates to a data communication apparatus, such as a facsimile machine, and, in particular, to a data communication apparatus having a reprogrammable voice memory capable of storing voice messages to be transmitted to a destination through a transmission network.

2. Description of the Prior Art

A data communication apparatus having a voice memory containing predetermined messages to be transmitted to a calling station, for example, when the apparaatus is not attended by an operator is well known. For example, a facsimile machine which can transmit a predetermined voice message to a caller while the operator of the facsimile machine is away is well known. However, in such prior art data communication apparatuses, a predetermined voice message is stored in a read only memory or simply ROM and thus the voice message is unalterable and cannot be altered by an operator, though it is often desired to change the stored voice message to another voice message depending on the circumstances in which the data communication apparatus is used.

SUMMARY OF THE INVENTION

In accordance with the present invention, there is provided a data communication apparatus, such as a facsimile machine, including a reprogrammable voice memory, typically a reprogrammable semiconductor memory device such as an EPROM, for storing desired voice messages which are transmitted to a destination station at a remote station or to a caller as needed. There is normally prepared a fixed memory, such as a ROM, having one or more predetermined voice messages and the voice messages may be selectively transferred to the reprogrammable voice memory in the data communication apparatus.

It is therefore a primary object of the present invention to obviate the disadvantages of the prior art as described above and to provide an improved data communication apparatus.

Another object of the present invention is to provide an improved data communication apparatus having a reprogrammable voice memory capable of storing one or more voice messages reprogrammably.

A further object of the present invention is to provide an improved facsimile machine capable of being used as a data communication terminal or a telephone terminal switchingly and also capable of storing a voice message to be transmitted to another station at a remote place.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic illustration showing in perspective view a facsimile machine constructed in accordance with one embodiment of the present invention;

FIG. 2 is an illustration showing how to combine FIGS. 2A and 2B;

FIGS. 2A and 2B, when combined as shown in FIG. 2, define a block diagram of a control circuit incorporated in the facsimile machine of FIG. 1.

DESCRIPTION OF THE PREFERRED EMBODIMENTS

Figure 3:
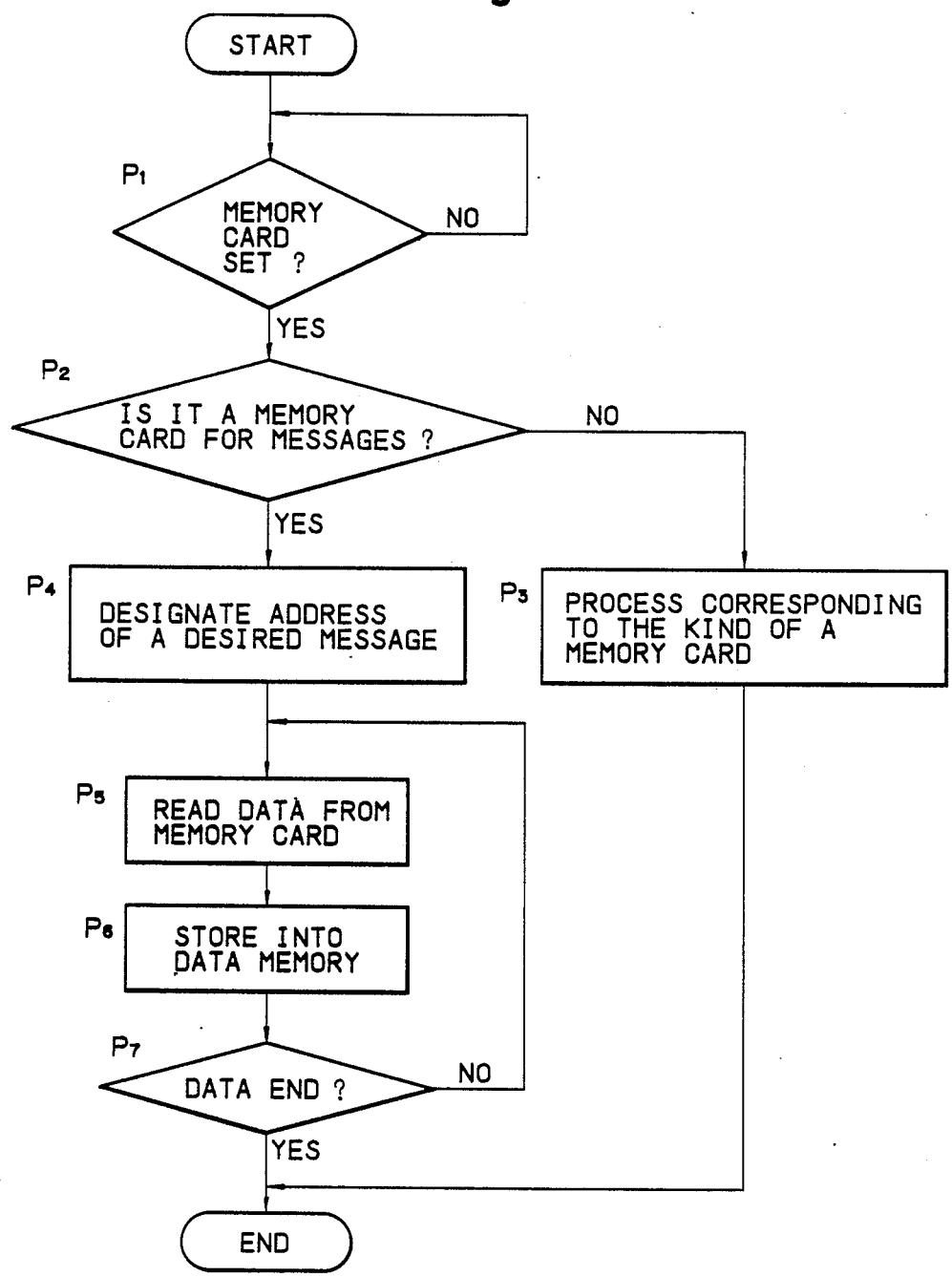
FIG. 3 is a flow chart showing a sequence of steps of a process for rewriting the reprogrammable voice memory provided in the facsimile machine of FIG. 1.

Referring to FIG. 1, there is schematically shown a facsimile machine 1 constructed in accordance with one embodiment of the present invention. As shown, the present facsimile machine 1 includes a main body 2, an original table 3 mounted on top of the main body 1 for placing thereon originals to be transmitted in the form of a stack, a control panel (operating unit) 4, and a telephone handset 5. The control panel or operating unit 4 is provided with numeric keys 4a, operational keys 4b for inputting various operational commands and display units 4c for displaying various information, such as input commands and data to be transmitted from the facsimile machine 1 to an operator. The telephone handset 5 is placed on a support 5a which is fixedly attached to the main body 2.

As shown in FIGS. 2A and 2B, the facsimile machine 1 includes a control system including a scanner 11, a plotter 12, a mechanism control unit 13, a buffer memory 14, a data compression and decompression unit 15, a transmission control unit 16, a MODEM 17, a net control unit 18, a system control unit 19, a voice unit 20, a data memory 21, a memory card reading unit 22, a memory card 23, a telephone handset 5 and an operating unit 4. During transmission, an original 24 is scanned by the scanner 11 to optically read the image information of the original 24 to thereby convert it into electrical image data which is then stored in the buffer memory 14. The image data thus stored in the buffer memory 14 is subjected to a data compression operation at the data compression and decompression unit 15 to thereby remove the redundancy of the image data. Then, after having been subjected to an image conversion process, such as magnification conversion and line density conversion, the image data is transmitted through the transmission control unit 16 to the MODEM 17 where the image data is modulated. The thus modulated image data is then transmitted to a network through the net control unit 18 having a so-called AA-NCY function.

During reception, modulated image data received through a network is supplied to the MODEM 17 through the net control unit 18 so that the image data is demodulated, and then the demodulated image data is supplied to the data compression and decompression unit 15 through the transmission control unit 16. The image data is decompressed to the original image data at the data compression and decompression unit 16 and then the original image data is supplied to the plotter 12 via the buffer memory 14. The image data thus supplied to the plotter 12 is recorded on a sheet of recording paper 25. In accordance with commands from the system controller 19, the mechanism control unit 13 controls the driving conditions of the plotter 12 and also the driving condition of the scanner 11.

The data memory 21 is a non-volatile and reprogrammable semiconductor memory, and one or more voice messages are stored in the data memory 21 in the form of voice data (digital data). The data stored in the data memory 21 may be rewritten by any desired one of a plurality of voice messages stored in the memory card 23 through the operation by the operator at the operating unit 4. The voice unit 20, for example, includes a voice LSI and a voice amplifier, and it reads out the voice data from the data memory 21 and synthesizes it in the form of a voice message which in turn is transmitted to a remote station through the network.

The memory card 23 is a so-called ROM card which stores a plurality of predetermined voice messages unalterably. The voice messages stored may include "This is Mr. such and such.", "This is Mrs. such and such.", "The operator is currently away.", If you desire facsimile transmission, please initiate facsimile transmission after hearing a "pee" sound.", and "If you wish to leave your vocal message, please state your message after hearing a "pee-pee" sound." The memory card 23 may be detachably inserted into the memory card reading unit 22, and the memory card reading unit 22 selectively reads the voice messages stored in the memory card 23 in accordance with commands from the operating unit 4 under control of the system controller 19. As shown in FIG. 1, the memory card reading unit 22 includes a card insertion slot 22a and a card discharging button 22b provided on the operating unit 4. A voice message read out from the memory card by the memory card reading unit 22 is written into the data memory 21 to be stored therein. The memory card 23 defines a fixed memory for storing a plurality of voice messages without alteration, and the data memory 21 defines a reprogrammable memory capable of storing one or more of the voice messages selectively transferred from the memory card 23. A combination of the data memory 21 and the memory card 23 defines a voice memory and the voice unit 20 defines a voice outputting means.

The system controller 19 controls the operation of the operating unit 4, which is an interface between the operator and the facsimile machine 1, the buffer memory 14, the data compression and decompression unit 15, the transmission control unit 16 and the mechanism control unit 13 which controls the mechanical parts of the facsimile machine 1. The system controller 19 also controls the operation of the voice unit 20, the data memory 21, and the memory card reading unit 22 to thereby carry out rewriting of voice messages and outputting of voice messages.

In operation, the facsimile machine 1 may be set in an attended mode, in which the facsimile machine 1 is attended by an operator, or an unattended mode, in which an operator is away and thus the facsimile machine 1 is not attended by an operator, selectively by operating the operating unit 4. When ringing occurs upon receipt of a call while the facsimile machine 1 is in the unattended mode, a voice message is transmitted by the voice unit 20 after receiving the call by an automatic call receiving function provided in the facsimile machine 1. In general, this voice message indicates the status of the facsimile machine 1, such as the absence of an operator, and guidance information, such as requesting the caller to transmit any message verbally and providing information regarding a facsimile reception procedure. And, the contents of such a voice message may differ depending on the conditions of the facsimile machine 1. Conventionally, use has been made of a fixed memory, such as a ROM, for storing such voice messages, in which case the contents of voice information stored in the voice memory cannot be altered even if the user wishes to change the contents of the voice message.

In accordance with the present facsimile machine 1, it is so structured that the contents of the voice messages stored in a voice memory can be altered by the operator. With particular reference to the flow chart shown in FIG. 3, a process for altering the contents of the voice message to be stored in the data memory 21 will be described in detail below.

In the first place, the operator selects a memory card, which contains a desired voice message, among a plurality of memory cards 23 prepared by a manufacturer and inserts the selected memory card 23 into the slot 22a to have it set in position in the memory card reading unit 22 (step $P_1$). When the memory card 23 has been set in position in the memory card reading unit 22, the system controller 19 checks the memory card 23 to determine whether or not the card is a memory card of voice messages (step $P_2$), and if it is a memory card of voice messages, it proceeds to a process corresponding to the kind of the memory card (step $P_3$).

If the memory card 23 which has been set in position is a memory card 23 of voice messages, then the operator carries out a key operation (designation of address) to select a desired voice message (step $P_4$) to thereby read out the voice data of the selected voice message at the designated address (step $P_5$). And, then, the voice data thus read out is stored into the data memory 21 (step $P_6$). Upon storing of all of the voice data read out from the designated address of the memory card 23 into the data memory 21, the process is completed (step $P_7$).

In this manner, in accordance with the present invention, since the operator can select a desired voice message from a plurality of voice messages prepared by a manufacturer, the operator can store appropriate voice messages in the facsimile machine 1. As a result, the operator can provide appropriate voice messages to the facsimile machine 1 depending on the circumstances in which the facsimile machine 1 has been placed.

The above-described embodiment has been described with respect to the case in which the present invention has been applied to a facsimile machine. However, the application of the present invention should not be limited only to facsimile machines and the present invention is equally applicable to so-called memo telephones and personal computers. Besides, use has been made of a memory card as the fixed memory in the embodiment described above; however, use may be made of any other type of fixed memory, if desired.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A data communication apparatus comprising:
   an external fixed memory in which a plurality of messages are stored;
   means for transmitting data to a remote station through a network and receiving data from a remote station through the network;
   a reprogrammable voice memory for storing at least one voice message to be transmitted to said remote station by said means for transmitting through said network; and
   means for arbitrarily selecting a message from said external fixed memory;

reading means for reading information stored in said external fixed memory at least partly for transferring said information read from said fixed memory to said reprogrammable voice memory, said external fixed memory including at least one voice message.

2. The apparatus of claim 1, wherein said reprogrammable voice memory includes a reprogrammable semiconductor memory.

3. The apparatus of claim 1, wherein said external fixed memory is a memory card.

4. The apparatus of claim 1, wherein said fixed memory is detachably set in position to be read by said reading means in said apparatus through an insertion slot.

5. The apparatus of claim 1, wherein said apparatus is a facsimile machine.

6. An apparatus according to claim 3, wherein said reading means includes a card insertion slot for inserting said memory card.

* * * * *